United States Patent
Forman

(10) Patent No.: US 10,248,825 B2
(45) Date of Patent: Apr. 2, 2019

(54) IMAGE PROCESSING

(71) Applicant: Hewlett-Packard Development Company, L.P., Houston, TX (US)

(72) Inventor: George Forman, Port Orchard, WA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 15/506,118

(22) PCT Filed: Aug. 29, 2014

(86) PCT No.: PCT/US2014/053518
§ 371 (c)(1),
(2) Date: Feb. 23, 2017

(87) PCT Pub. No.: WO2016/032524
PCT Pub. Date: Mar. 3, 2016

(65) Prior Publication Data
US 2017/0286738 A1    Oct. 5, 2017

(51) Int. Cl.
G06K 9/00 (2006.01)
G06K 7/14 (2006.01)
G06K 9/34 (2006.01)
G06K 9/48 (2006.01)
(Continued)

(52) U.S. Cl.
CPC .......... *G06K 7/1478* (2013.01); *G06K 9/346* (2013.01); *G06K 9/48* (2013.01); *G06K 9/58* (2013.01); *G06K 9/3283* (2013.01)

(58) Field of Classification Search
CPC combination set(s) only.
See application file for complete search history.

(56) References Cited

U.S. PATENT DOCUMENTS 5,157,740 A * 10/1992 Klein ................ G06K 9/38
                                                   358/462
5,371,810 A * 12/1994 Vaidyanathan .......... G06K 9/48
                                                   382/204
5,594,807 A     1/1997  Liu
(Continued)

FOREIGN PATENT DOCUMENTS

| JP | 20050267598 | 9/2005 |
|---|---|---|
| WO | WO-02101634 A1 | 12/2002 |
| WO | WO-2006078359 A1 | 7/2006 |

OTHER PUBLICATIONS

Milette et al; "Android Sensor Programming"; dated May 15, 2012, 61 pages http://pskla.kpi.ua/lib/2013/AndroidSensorProgramming2012.pdf.

(Continued)

*Primary Examiner* — Alex Kok S Liew
(74) *Attorney, Agent, or Firm* — HP Inc. Patent Department

(57) ABSTRACT

An example method is of image processing provided in according with one implementation of the present disclosure. The method includes receiving an image, placing a window across the image, and computing a set of all occurring grayscale values within the window. The method further includes computing a threshold value based on the set of all occurring grayscale values within the window and determining an output pixel value of at least one pixel from the window based on the threshold value.

16 Claims, 4 Drawing Sheets

(51) Int. Cl.
    *G06K 9/58*    (2006.01)
    *G06K 9/32*    (2006.01)

(56) References Cited

U.S. PATENT DOCUMENTS

| | | | |
|---|---|---|---|
| 5,809,161 A * | 9/1998 | Auty | G01P 3/38 |
| | | | 340/937 |
| 6,081,627 A | 6/2000 | Kannon et al. | |
| 6,577,748 B2 | 6/2003 | Chang | |
| 2001/0007116 A1 | 7/2001 | Zhou et al. | |
| 2003/0053691 A1 | 3/2003 | Chamberlain | |
| 2011/0290882 A1 | 12/2011 | Gu et al. | |
| 2012/0018518 A1* | 1/2012 | Strom | G06T 5/003 |
| | | | 235/462.04 |
| 2013/0155474 A1 | 6/2013 | Roach et al. | |
| 2013/0170765 A1 | 7/2013 | Santos et al. | |

OTHER PUBLICATIONS

QualitySoft~"Uneven Exposure"; http://abdghn.ir/pdf/Barcode%20Processing.pdf~2008 (White Paper)~30 pages.
A.C. Sparavigna, "Shannon, Tsallis and Kaniadakis entropies in bi-level image thresholding," International Journal of Sciences 4(2), 35-43, 2015.

\* cited by examiner

IMAGE PROCESSING

BACKGROUND

Image processing continues to play an important role in people's lives. Individuals and organizations regularly use different types of image processing. For example, optical machine-readable representation of data on packaging (i.e., barcodes) is a form of image processing that is convenient way to transmit information related to a product.

DETAILED DESCRIPTION OF SPECIFIC EXAMPLES

Figure 1:
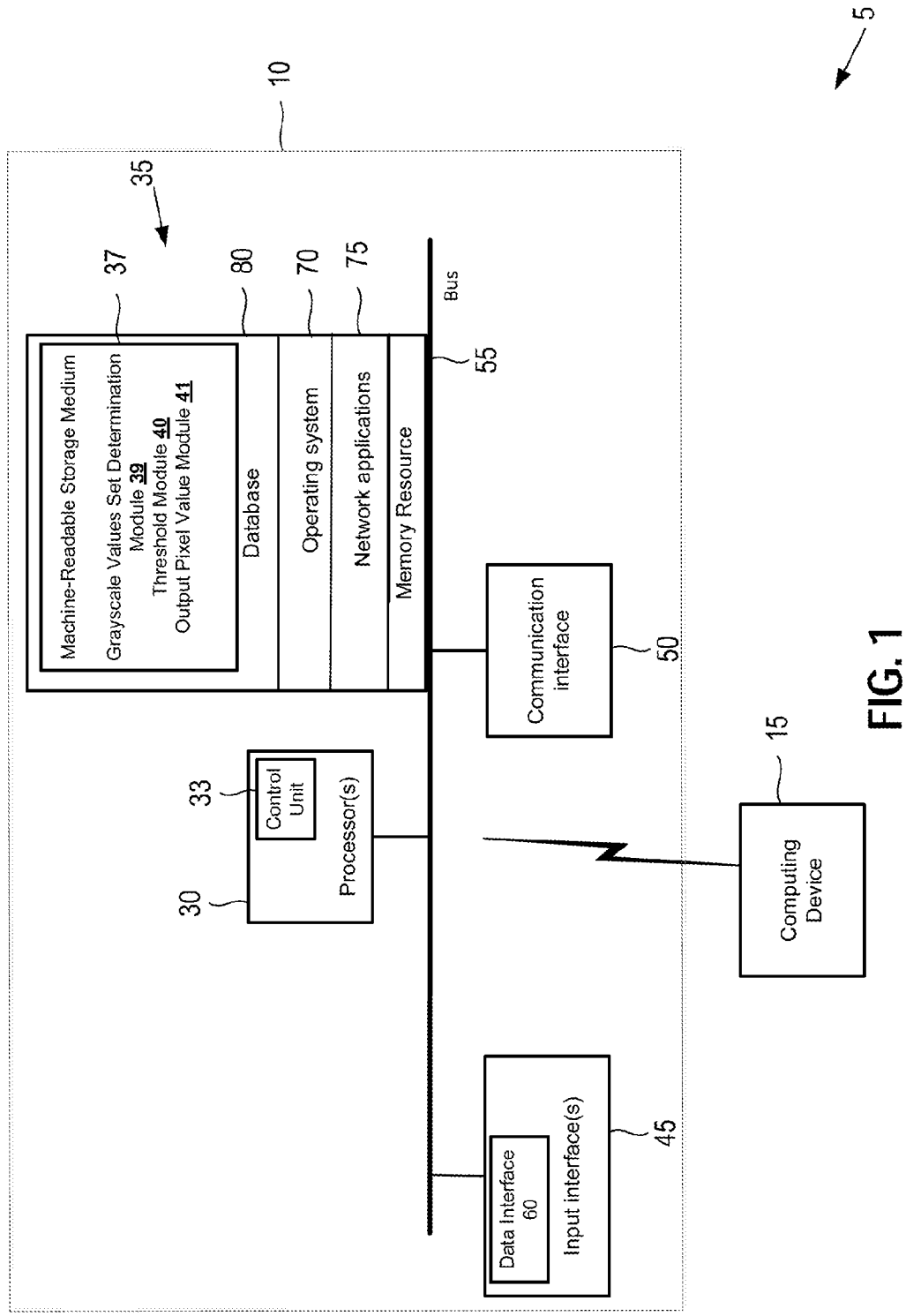
FIG. 1 is a schematic illustration of an example system for image processing in accordance with an implementation of the present disclosure.

Image processing of various types of images, documents, and other data is frequently used today. For example, image processing may be used in products' barcode reading, processing financial information (e.g., electronic deposits, etc.), optical character recognition ("OCR"), and many other fields. With the recent improvements in technology, computing systems and devices continue to assist users with image processing. As used herein, the terms "electronic device," "computing device," and "device" are to be used interchangeably and refer to any one of various personal computers, printers, smartphones, wearable electronic devices, display screens, tablets, personal data assistants (PDA's), laptops, servers, and other similar electronic devices that include a processor and memory.

One method of image processing or segmentation is binary image thresholding. In one example, binary thresholding takes a grayscale image and uses thresholding to create a binary image (i.e., where each pixel of the image is either black or white). This and other similar techniques may be used by different image processing systems (e.g., barcode readers or scanners, etc.).

One issue with available mechanisms for image processing is that the images presented to the different image processing systems (e.g., barcode readers) may not be of good quality and the image processing systems may not be able to accurately read and interpret the presented image. For example, the success rate for many barcode readers is very low (e.g., about 60%). Therefore, an improved method for image processing that will present a clear readable image to an image processing system (e.g., barcode reader) is desired.

The present description is directed to methods, systems, and computer readable media for improved image processing (e.g., binary image thresholding). Specifically, the present description proposes an approach for processing a received image by using a window placed across the image. The proposed approach includes computing a set of all occurring grayscale values within the window, computing a threshold value of grayscale brightness based on the set of all occurring grayscale values within the window, and determining an output pixel value of at least one pixel from the window based on the threshold value. In other words, the computation is not concerned with the set of all pixels with all occurring grayscale values, but with the (typically smaller) set of grayscale values that occur within the window. In one example, the set of ail occurring grayscale values within the window is determined by computing a histogram of grayscale values for the window and selecting the grayscale values that have a non-zero count to compute the set of all occurring grayscale values.

Therefore, the proposed approach "ignores" the count in each histogramed window, but instead simply uses the unique set of non-zero grayscale values from which to determine a threshold value of grayscale brightness. Thus, in one example, the threshold value of grayscale brightness is computed by computing an average grayscale value of the set of all occurring grayscale values in the window. Then, an output pixel value of at least one pixel from the window is determined by comparing the grayscale value of that pixel to the threshold value.

This approach may be iteratively applied to multiple windows (e.g., the window may be moved through the image one pixel at a time) until the entire image (or a desired potion of the image, e.g., a barcode) is transformed to an improved binary image that may be easily recognized by an image processing system. During each sliding window iteration, the approach may include removing and adding at least one pixel from the window, and using the histogram to keep track of the number of pixels at each grayscale value in the window. The proposed approach delivers a processed image that may be accurately interpreted and processed by image processing systems. For example, the success rate of a barcode reader using images processed with the proposed technique may improve significantly over standard image processing. The proposed technique may be applied to different areas of image processing product barcode reading, OCR processing, etc.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. Furthermore, the term "based on," as used herein, means "based at least in part on." It should also be noted that a plurality of hardware and software based devices, as well as a plurality of different structural components may be used to implement the disclosed methods and devices.

FIG. 1 is a schematic illustration of an example system 5 for image processing (e.g., binary image thresholding). The illustrated system 5 is capable of carrying out the techniques described below. As shown in FIG. 1, the system 5 is depicted as including an electronic or computing device 10 to process an image. In one example, the image may be stored on the device 10 or may be received from another computing device (e.g., computing device 15) that stores various data. It is to be understood that the techniques described in relation to the device 10 may be implemented with any other electronic/computing device.

For example, the computing device 10 may be a USB device attachable to another computing device (e.g., a barcode reader), a card or a chip on the system board embedded in a computing device, a laptop, a personal computer, a tablet, an all in one computing device, a gaming console, a server, a smartphone, a visual player, a personal digital assistant (PDA), a cellular telephone, an electronic notepad, a plurality of distributed computing devices, or any other suitable computing device that includes a processor. In alternative implementations, the techniques performed by the device 10 could be performed by software modules built into the processor of a computing device that provides images (e.g., the device 15, etc.) or built into the processor of an image processing device (e.g., barcode reader). In the illustrated example, the computing device 10 may include at least one processing device 30 (also called a processor), a memory resource 35, input interface(s) 45, and a communication interface 50.

In other examples, the computing device 10 may include additional components and some of the components depicted therein may be removed and/or modified without departing from a scope of the system that allows for carrying out the functionality described herein. It is to be understood that the operations described as being performed by the computing device 10 that are related to this description may, in some implementations, be performed or distributed between the computing device and other electronic/computing devices or processors (not shown).

As explained in additional details below, the computing device 10 may include software, hardware, or a suitable combination thereof configured to enable functionality of the computing device 10 and to allow it to carry out the techniques described below and to interact with the one or more systems or devices. The computing device 10 may include communication interfaces (e.g., a Wi-Fi® interface, a Bluetooth® interface, a 3G interface, a 4G interface, a near field communication (NFC) interface, etc.) that are used to connect with other devices/systems and/or to a network. (not shown). The network may include any suitable type or configuration of network to allow for communication between the computing device 10 and any other devices/systems (e.g., other electronic devices, computing devices, displays, etc.).

The processing device 30 of the computing device 10 (e.g., a central processing unit, a group of distributed processors, a microprocessor, a microcontroller, an application-specific integrated circuit (ASIC), a graphics processor, a multiprocessor, a virtual processor, a cloud processing system, or another suitable controller or programmable device), the memory resource 35, the input interfaces 45, and the communication interface 50 may be operatively coupled to a bus 55.

The communication interface 50 may allow the computing device 10 to communicate with plurality of networks, communication links, and external devices. The input interfaces 45 can receive information from devices/systems in communication with the computing device 10. In one example, the input interfaces 45 include at least a data interface 60 that may receive data (e.g., images, etc.) from any external device or system (e.g., the computing device 15).

The processor 30 includes a controller 33 (also called a control unit) and may be implemented using any suitable type, of processing system where at least one processor executes computer-readable instructions stored in the memory 35. In some examples, the processor 30 may receive input from an input device (not shown) or any other computing device system in communication with the device 10.

The memory resource 35 includes any suitable type, number, and configuration of volatile or non-transitory machine-readable storage media 37 to store instructions and data. Examples of machine-readable storage media 37 in the memory 35 include read-only memory ("ROM"), random access memory ("RAM") (e.g., dynamic RAM ["DRAM"], synchronous DRAM ["SDRAM"], etc.), electrically erasable programmable read-only memory ("EEPROM"), magnetoresistive random access memory (MRAM), memristor, flash memory, SD card, floppy disk, compact disc read only memory (CD-ROM), digital video disc read only memory (DVD-ROM), and other suitable magnetic, optical, physical, or electronic memory on which software may be stored. The memory resource 35 may also be used for storing temporary variables or other intermediate information during execution of instructions to by the processor 30.

The memory 35 may also store an operating system 70 and network applications 75. The operating system 70 can be multi-user, multiprocessing, multitasking, multithreading, and real-time. The operating system 70 can also perform basic tasks such as recognizing input from input devices; sending output to output devices; keeping track of files and directories on memory 35; controlling peripheral devices, such as printers, image capture device; and managing traffic on the bus 55. The network applications 75 include various components for establishing and maintaining network connections, such as computer-readable instructions for implementing communication protocols.

The memory 35 may include at least one database 80. In other example implementations, the device 10 may access external database (not shown) that may be stored remotely of the computing device 10 (e.g., can be accessed via a network or a cloud). The database 80 may store various information to be processed by the device 10, such as images, etc.

Software stored on the non-transitory machine-readable storage media 37 and executed by the processor 30 includes, for example, firmware, applications, program data, filters, rules, program modules, and other executable instructions. The control unit 33 retrieves from the machine-readable storage media 37 and executes, among other things, instructions related to the control processes and methods described herein. In one example, the instructions stored in the non-transitory machine-readable storage media 37 implement at least a grayscale value set determination module 39, a threshold module 40, and an output pixel value module 41. In other examples, the instructions can implement more or fewer modules (e.g., various other modules related to the operation of the device 10). In one example, modules 39-41 may be implemented with electronic circuitry used to carry out the functionality described below. As mentioned above, in addition or as an alternative, modules 39-41 may be implemented as a series of instructions encoded on a machine-readable storage medium and executable by a processor. Therefore, as used herein, a module can include program code, e.g., computer executable instructions, hardware, firmware, and/or logic, to perform particular actions, tasks, and functions described in more detail herein in reference to FIGS. 2-4.

As explained in additional details below, the grayscale value set determination module 39 may compute a set of all occurring grayscale values within a window sliding across an image. In one example, the set of all occurring grayscale values within the window may be computed by computing a histogram of grayscale values for the window and selecting the grayscale values that have a non-zero count to define the set of all occurring grayscale values.

In addition, the threshold module 40 may compute a threshold value grayscale brightness based on the set of all occurring grayscale values within the window. The threshold value may be determined by computing an average or a median grayscale value of the set of all occurring grayscale values in the window. As explained in additional details below, the output pixel value module 41 may determine an output pixel value of at least one pixel from the window based on the threshold value. In one example, the module 41 may compare the grayscale value of the at least one pixel to the threshold value to determine the output pixel value of the at least one pixel (e.g., black or white).

Figure 2:
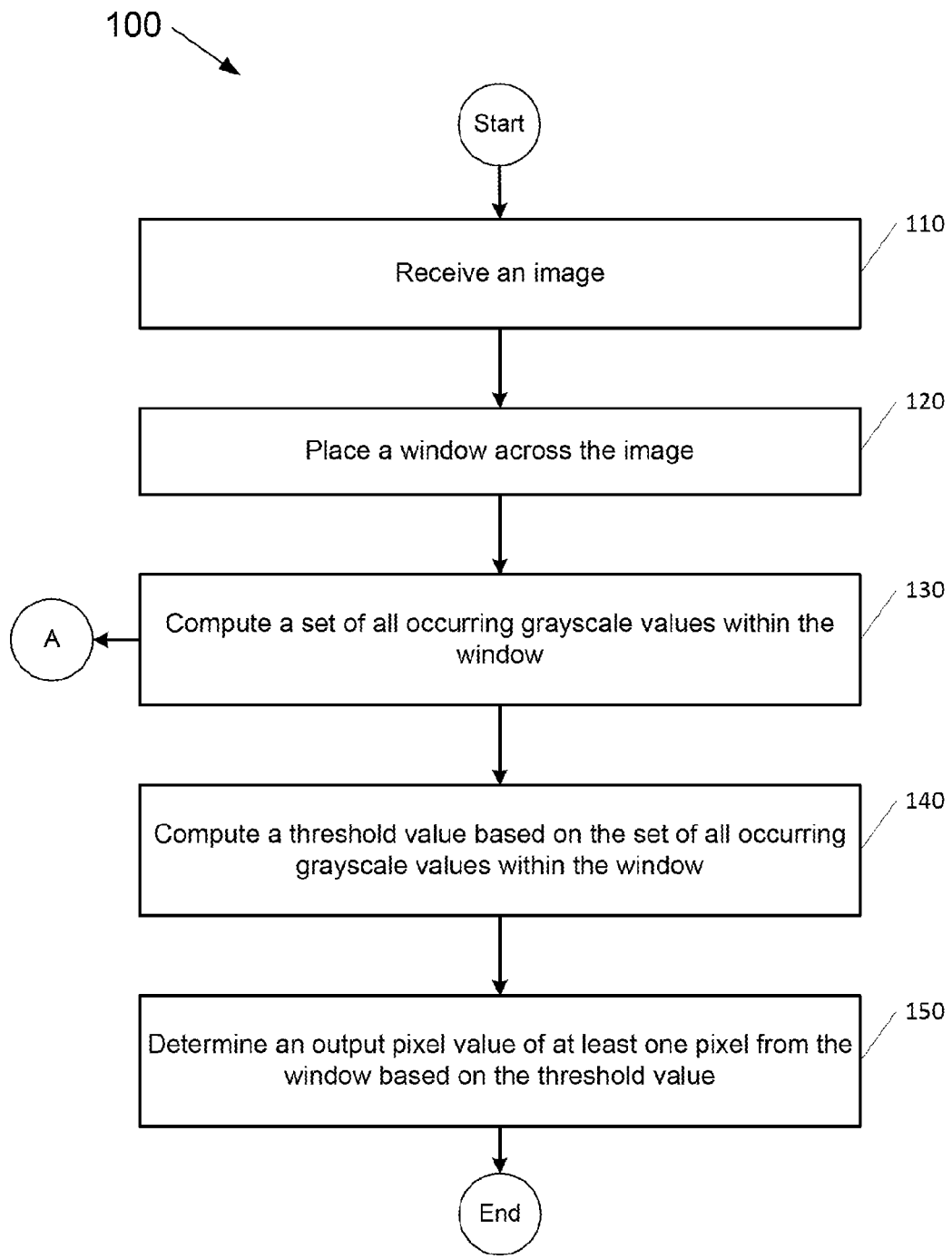
FIG. 2 illustrates a flow chart showing an example of a method for image processing in accordance with an implementation of the present disclosure.

FIG. 2 illustrates a flow chart showing an example of a method 100 for image processing. It is to be understood that while the method is described in relation to barcode images, the method may be applied to other types of images and may be generally used as a method for determining an edge in an image. The method may run a window vertically, horizontally, or diagonally across an image to find the edge of an image.

In one example, the method 100 can be executed by the control unit 33 of the processor 30 of the computing device 10. Various elements or blocks described herein with respect to the method 100 are capable of being executed simultaneously, in parallel, or in an order that differs from the illustrated serial manner of execution. The method 100 is also capable of being executed using additional or fewer elements than are shown in the illustrated examples.

The method 100 may be executed in the form of instructions that may be encoded on a non-transitory machine-readable storage medium 37 executable by the processor 30 of the computing device 10. In one example, the instructions for the method 100 implement modules 39-41. In other examples, the execution of the method 100 may be distributed between the processing device 30 and other processing devices in communication with the processing device 30. In yet another example, the method 100 may be executed on another computing device connected to the computing device 10 or on several computing devices.

The method 100 begins at block 110, where the processor 30 receives an image (e.g., a barcode image, etc.). In one example, the image may be received from a computing device (e.g., the device 15) or it may be retrieved from the memory 35 of the device 10.

At 120, the control unit 33 places a window (not shown) across the image. The proposed approach may assume that the barcode is positioned/oriented correctly on the image, such that a horizontal scan of pixels with the window through the barcode image will cover all the lines in the barcode. As explained in additional details below, the window may be iteratively slid through the image one pixel at a time until the desired portion of the image is processed. In another implementation, multiple windows may be concurrently processed to determine an output pixel value of at least one pixel (or multiple pixels) within each window.

The window being placed across the image may include a plurality of pixels from the image and may have a different size. In one example, the window may have a width of 10-30 pixels (or any other width) and a height of at least one pixel, where the width of the window may be determined based on the processed image. For instance, an ISBN barcode is likely to include a number of vertical black bars (e.g., 30 bars, etc.). In that example, the width of the window may be the width of the image in pixels divided by the granularity of the barcode (i.e., the number of vertical black bars). In some implementations, each pixel row of the image may be processed separately. The window may include the same number of pixel rows above and below an identified location on the image. In other examples (i.e., for reading vertical barcode bars), the window may slide vertically across the image.

Next, the control unit 33 computes a set of all occurring grayscale values within the window (at 130). Techniques described in blocks 120 and 130 may be performed by the grayscale value set determination module 39. As explained in additional details below, the set of all occurring grayscale values within the window is used to determine an output pixel value of at least one pixel from the window. The specific method for computing the set of all occurring grayscale values within the window is described below in relation to FIG. 3. However, it is important to note that the unique set for each window includes only the selected grayscale values in the window that have a non-zero count (i.e., the grayscale values with a zero count are not included in the set).

Figure 3:
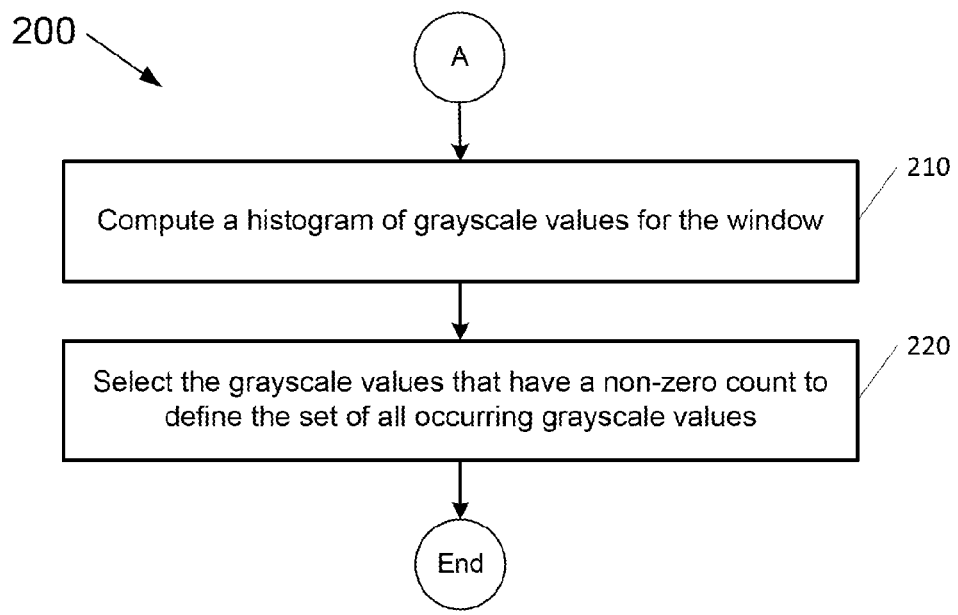
FIG. 3 illustrates a flow chart showing an example of a method for computing a set of all occurring grayscale values within a window in accordance with an example implementation of the present disclosure.

FIG. 3 illustrates a flow chart showing an example of a method 200 for computing a set of all occurring grayscale values within the window. The method 200 may be executed in the form of instructions that may be encoded on a non-transitory machine-readable storage medium 37 executable by the processor 30 of the computing device 10. In one example, the instructions for the method 100 implement the grayscale value set determination module 39.

The method 200 begins at 210, where the control unit 33 computes a histogram (not shown) of grayscale values for the window (i.e., for the pixels in the window). In one example, the x-axis of the histogram may represent the grayscale values found in the window. Possible values may be between 0 (black) and 255 (white), The y-axis of the histogram may represent the frequency of that grayscales value in the window (i.e., how many pixels have each of the grayscale values).

At 220, the control unit 33 selects the grayscale values that have a non zero count to define the set of all occurring grayscale values. Therefore, the set of all occurring grayscale values is defined by including only the grayscale values having a non-zero count in the histogram. In other words, the set does not include all pixels with all occurring grayscale values, but only the set of grayscale values that occur within the window. As described in additional details below, the proposed method "ignores" the count for each grayscale value that appears in the window (i.e., how many times each grayscale value appears). Instead, the method uses the unique set occurring grayscale values to compute the threshold value used to determining an output pixel value of at least one pixel in the window.

Thus, the set of all occurring grayscale values within a window may be different for each new window. For example, if the following grayscale values occurred in the window: the value 0 (which is completely black) occurred 7 times, the value 14 occurred 26 times, the value 16 occurred 20 times, the value 19 occurred 12 times, the value 180 occurred 7 times, and the value 255 (which is completely white) occurred 3 times, the set of all occurring grayscale values is {0, 14, 16, 19,180,255}.

With continued reference to FIG. 2, at 140, the control unit 33 computes a threshold value of grayscale brightness based on the set of all occurring grayscale values within the window. In one example, the threshold value is computed by computing an average grayscale value of the set of all occurring grayscale values in the window. This is not the same as computing the average grayscale value of all the pixels in the window. In another example, the threshold value is computed by computing a median grayscale value of the set of all occurring grayscale values in the window. Techniques described in block 140 may be performed by the threshold module 40.

Using the example set described above {0, 14, 16 and 19,180,255}, the threshold value may be calculated by computing the average grayscale value of the set 0+14+16+ 19+180+250=479/6=79.8 threshold value. Therefore, the proposed method "ignores" the count for each grayscale value that appears in the window and calculates the average of the values that appear in the window.

At 150, the control unit 33 determines an output pixel value of at east one pixel from the window based on the threshold value. In one example, the at least one pixel of the window is a middle pixel of the window. In another example, the at least one pixel is another pixel from the window, or the output pixel value for multiple adjacent (or non-adjacent) pixels from the window may be determined. Techniques described in block 140 may be performed by the output pixel value module 41.

For instance, the grayscale value of the identified at least one pixel may be compared to the threshold value. The output pixel value of the at least one pixel may be identified as white if a grayscale value of the at least one pixel is above the threshold value. Also, the output pixel value of the at least one pixel may be identified as black if grayscale value of the at least one pixel is below the threshold value.

This proposed method 100 provides an improved technique for image processing. In one example, the method allows for binary image thresholding, where the binary threshold is not affected by the presence of more black or white pixels in the window. For example, if an image includes a large number of white pixels and a smaller number of black pixels, the binary threshold of the image may be affected by the fact that there are more white than black pixels. If the average pixel value for the entire image (or a local region of the image) is used for image thresholding (instead of the average of a set of all occurring grayscale values), the threshold will be biased toward the white group of pixels.

The techniques described in relation to he method 100 may be iteratively performed for multiple windows (e.g., the window may be iteratively slid through the image one pixel at a time) unto the desired portion of the image is processed. Various techniques may be applied by the method to determine where to place the first window when processing the image. Each window may determine an output pixel value of at least one pixel (or multiple pixels). In one example, sliding the window across the image may include removing at least one pixel from the window and adding at least one pixel from the window during each sliding iteration. For instance, at each new pixel position, the processor may slide the window one pixel over.

Adding a new pixel to the window may include obtaining the grayscale value of the new pixel and incrementing the histogram count for that grayscale value. Similarly, to remove an old pixel (i.e., a grayscale value) that is leaving the local window, the histogram count for the grayscale value may be decremented. That way, the histogram may be used to keep track of the number of pixels at each grayscale value in the window, which is used to determine the set of grayscale values in the window. At the end of the process, the desired image portion (e.g., the barcode) may be transformed to an improved binary image that may be easily recognized by an image processing system. In another implementation, multiple windows may be concurrently processed (by one or more processors) to determine an output pixel value of at least one pixel (or multiple pixels) within each window. That way, the image (or a portion of the image) may be processed faster.

The set of grayscale values may be incrementally maintained when the histogram is adjusted. After incrementing a histogram count, if the count is now one (i.e., it was previously zero), then that grayscale value is added to the set. After decrementing a histogram count, if the count is now zero, then that grayscale value is removed from the set.

Furthermore, the average of the set of grayscale values may be incrementally maintained by keeping track of the size of the set and the sum of the set. When a grayscale value is added to the set, the size is incremented and the grayscale value is added to the sum. When a grayscale value is removed from the set, the size is decremented and the grayscale value is subtracted from the sum. In this way no explicit representation of the set needs to be maintained.

Figure 4:
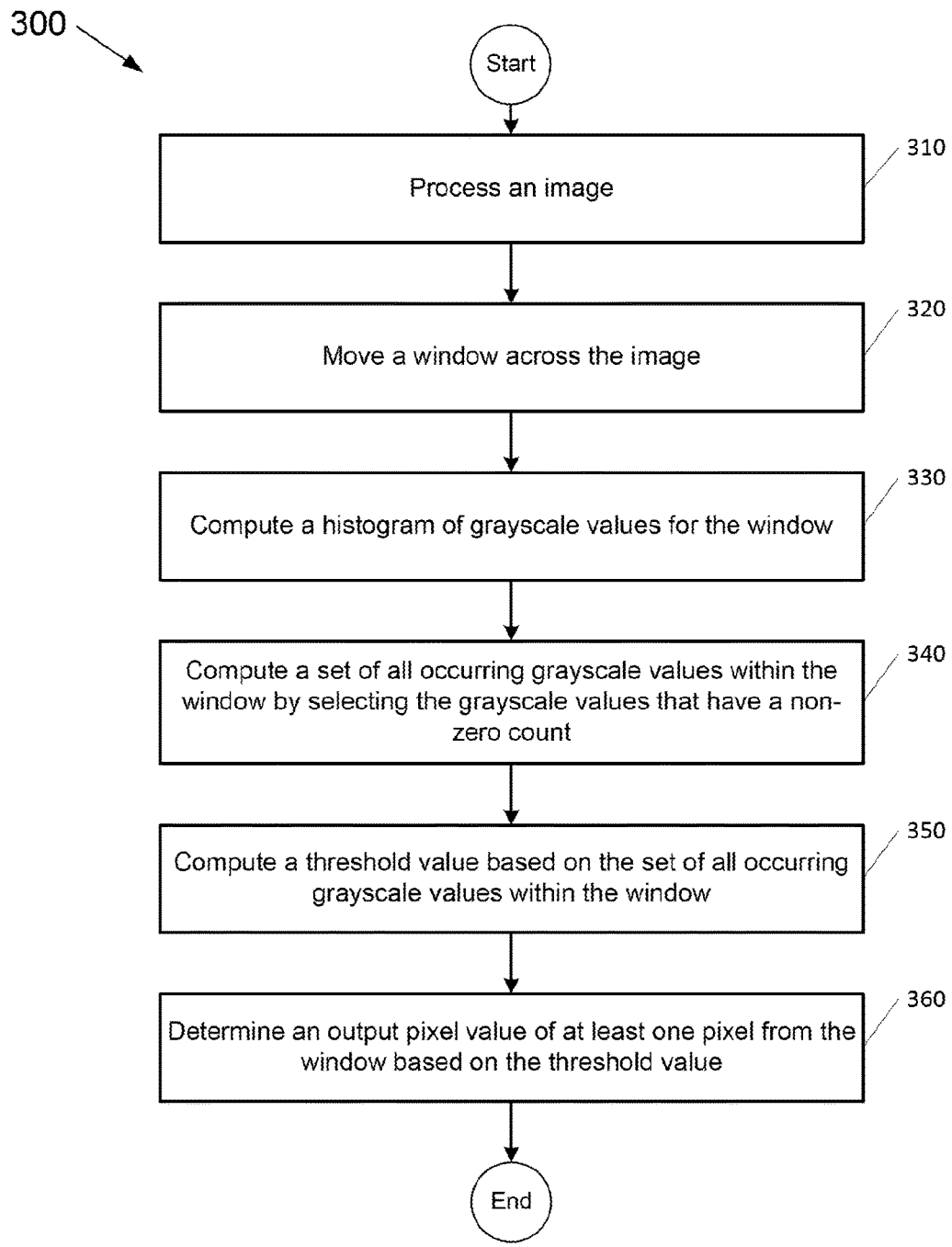
FIG. 4 illustrates a flow chart showing an example of an alternative method for image processing in accordance with an implementation of the present disclosure.

FIG. 4 illustrates a flow chart showing details of an alternative method 300 for image processing in accordance with an example implementation of the present disclosure. The method 300 may be executed with the grayscale value set determination module 39, the threshold module 40, and the output pixel value module 41, where these modules are implemented with electronic circuitry used to carry out the functionality described below. It is to be understood that the method 300 may be implemented by the computing device 10 of the system 5 or by any other similar electronic device in communication with a computing device.

The method 300 begins at 310, where the processing device 30 processes an image. Block 310 may be similar to block 110 of method 100. At 320, the processing device 30 moves or slides (e.g., iteratively) a window across the image. The techniques in block 320 may be similar to block 120 of the method 100, where the control unit 33 slides a window across an image.

At 330, the processing device 30 computes a histogram of grayscale values for the window. Block 330 may be similar to block 210 of method 200. Next, at 340, the processing device 30 computes a set of all occurring grayscale values within the window by selecting the grayscale values that have a non-zero count. The steps in block 323 may be similar to the techniques described in block 130 of method 100 and block 220 of method 200, where the control unit selects the grayscale values that have a non-zero count to define the set of all occurring grayscale values.

Then, the processing device 30 computes a threshold value based on the set of all occurring grayscale values within the window (at 350). The techniques in block 350 may be similar to block 140 of method 100. At 360, the processing device 30 determines an output pixel value of at least one pixel from the window based on the threshold value. Block 360 may be similar to block 150 of method 100, where the control unit determines whether the output pixel value of the at least one pixel is white or black by comparing the grayscale value of the at least one pixel with the threshold value.

What is claimed is:

1. A method of image processing comprising, by at least one processing device:
receiving an image;
placing a window across the image;

computing a set of all occurring grayscale values within the window;

computing a threshold value based on the set of all occurring unique grayscale values within the window, including considering every occurring unique grayscale value without considering a number of occurrences of each occurring unique grayscale value within the set; and determining an output pixel value of at least one pixel from the window based on the threshold value.

2. The method of claim 1, wherein computing the set of all occurring grayscale values within the window further comprises:

computing a histogram of grayscale values for the window; and selecting the grayscale values that have a non-zero count to define the set of all occurring grayscale values.

3. The method of claim 1, wherein computing the threshold value further includes computing an average grayscale value of the set of all occurring grayscale values in the window.

4. The method of claim 1, wherein computing the threshold value further includes computing a median grayscale value of the set of all occurring grayscale values in the window.

5. The method of claim 1, wherein the at least one pixel is a middle pixel of the window, and wherein the image includes a barcode.

6. The method of claim 1, wherein the output pixel value of the at least one pixel is identified as white if a grayscale value of the at least one pixel is above the threshold value, and wherein the output pixel value of the at least one pixel is identified as black if a grayscale value of the at least one pixel is below the threshold value.

7. The method of claim 2, wherein sliding the window across the image further comprises: removing and adding at least one pixel from the window during each sliding iteration, and using the histogram to keep track of the number of pixels at each grayscale value in the window.

8. A system comprising:
at least one processing device with a control unit to:
process an image;
move a window across the image;
compute a histogram of grayscale values for the window; and
compute a set of all occurring grayscale values within the window by selecting the grayscale values that have a non-zero count;
compute a threshold value based on the set of all occurring unique grayscale values within the window, including considering every occurring unique grayscale value without considering a number of occurrences of each occurring unique grayscale value within the set; and
determine an output pixel value of at least one pixel from the window based on the threshold value.

9. The system of claim 8, the control unit further to: compute an average grayscale value of the set of all occurring grayscale values in the window to compute the threshold value.

10. The system of claim 8, wherein the at least one pixel is a middle pixel of the widow, and wherein the image is an optical character recognition image.

11. The system of claim 8, wherein the output pixel value of the at least one pixel is identified as white if a grayscale value of the at least one pixel is above the threshold value, and wherein the output pixel value of the at least one pixel is identified as black if a grayscale value of the at least one pixel is below the threshold value.

12. The system of claim 8, the control unit further to: remove and add at least one pixel from the window during each sliding iteration, and use the histogram to keep track of the number of pixels at each grayscale value in the window.

13. A non-transitory machine-readable storage medium encoded with instructions executable by at least one processor, the machine-readable storage medium comprising instructions to:
process an image;
iteratively slide a window across the image;
compute a histogram of grayscale values for the window; and
compute a set including all occurring grayscale values within the window by including grayscale values having a non-zero count in the histogram;
compute a threshold value based on the set of all occurring unique grayscale values within the window, including considering every occurring unique grayscale value without considering a number of occurrences of each occurring unique grayscale value within the set; and
identify an output pixel value of at least one pixel from the window based on the threshold value.

14. The non-transitory machine-readable storage medium, further comprising instructions to: compute an average grayscale value of the set of all occurring grayscale values in the window to compute the threshold value.

15. The non-transitory machine-readable storage medium, further comprising instructions to: identify the output pixel value of the at least one pixel as white if a grayscale value of the at least one pixel is above the threshold value, and identify the output pixel value of the at least one pixel as black if a grayscale value of the at least one pixel is below the threshold value.

16. The method of claim 1, wherein computing the threshold value comprises computing an average of the set of all occurring unique grayscale values.

* * * * *